(12) United States Patent
Lo

(10) Patent No.: US 10,108,796 B2
(45) Date of Patent: Oct. 23, 2018

(54) SYSTEM AND METHOD FOR PIN ENTRY ON MOBILE DEVICES

(71) Applicant: BBPOS LIMITED, Tsuen Wan (HK)

(72) Inventor: Chi Wah Lo, Hong Kong (HK)

(73) Assignee: BBPOS LIMITED, Tsuen Wan (HK)

( * ) Notice: Subject to any disclaimer, the term of this patent is extended or adjusted under 35 U.S.C. 154(b) by 83 days.

(21) Appl. No.: 14/100,076

(22) Filed: Dec. 9, 2013

(65) Prior Publication Data

US 2014/0164782 A1 Jun. 12, 2014

Related U.S. Application Data

(60) Provisional application No. 61/736,116, filed on Dec. 12, 2012.

(51) Int. Cl.

| | |
|---|---|
| *G06F 21/35* | (2013.01) |
| *G06F 21/00* | (2013.01) |
| *G06F 21/31* | (2013.01) |
| *G06F 21/72* | (2013.01) |
| *H04W 12/06* | (2009.01) |
| *H04W 12/12* | (2009.01) |
| *G06F 3/01* | (2006.01) |
| *G06F 3/023* | (2006.01) |
| *G06F 3/038* | (2013.01) |
| *G06F 3/0488* | (2013.01) |

(52) U.S. Cl.
CPC .............. *G06F 21/35* (2013.01); *G06F 3/013* (2013.01); *G06F 3/0233* (2013.01); *G06F 3/038* (2013.01); *G06F 3/04886* (2013.01); *G06F 21/31* (2013.01); *G06F 21/72* (2013.01); *H04W 12/06* (2013.01); *H04W 12/12* (2013.01); *G06F 2203/0383* (2013.01)

(58) Field of Classification Search
CPC .......... G06F 21/34; G06F 21/35; G06F 21/31; G06F 21/72; G06F 3/013; G06F 3/0233; G06F 3/038; G06F 3/04886; G06F 2203/0383; H04W 12/06; H04W 12/12
See application file for complete search history.

(56) References Cited

U.S. PATENT DOCUMENTS

| | | | |
|---|---|---|---|
| 2006/0053301 A1* | 3/2006 | Shin ........................ | G06F 21/36 713/183 |
| 2007/0174615 A1 | 7/2007 | Ballou et al. | |
| 2012/0047564 A1* | 2/2012 | Liu ........................ | G06Q 20/10 726/6 |

(Continued)

*Primary Examiner* — Mohammad A Siddiqi
(74) *Attorney, Agent, or Firm* — Gregory M. Howison

(57) ABSTRACT

A system for entering a secure Personal Identification Number (PIN) into a mobile computing device includes a mobile computing device and a peripheral device that are connected via a data communication link. The mobile computing device includes a mobile application and a display and the mobile application runs on the mobile computing device and displays a grid on the mobile computing device display. The peripheral device includes a display and an encryption engine, and the peripheral device display displays a grid corresponding to the grid displayed on the mobile computing device display. Positional inputs on the mobile computing device grid are sent to the peripheral device and the peripheral device decodes the positional inputs into PIN digits and generates an encrypted PIN and then sends the encrypted PIN back to the mobile computing device.

18 Claims, 3 Drawing Sheets

(56) References Cited

U.S. PATENT DOCUMENTS

| | | | | |
|---|---|---|---|---|
| 2012/0104090 | A1* | 5/2012 | Gross | G07F 7/088 |
| | | | | 235/379 |
| 2012/0268393 | A1 | 10/2012 | Lee | |
| 2012/0280923 | A1* | 11/2012 | Vincent | G06F 3/044 |
| | | | | 345/173 |
| 2013/0086389 | A1* | 4/2013 | Suwald | G06F 21/34 |
| | | | | 713/185 |
| 2013/0127725 | A1* | 5/2013 | Sugimoto | G06F 3/02 |
| | | | | 345/168 |
| 2013/0333011 | A1* | 12/2013 | Quigley | G06Q 20/3674 |
| | | | | 726/7 |
| 2014/0324708 | A1* | 10/2014 | McCauley | G06F 21/35 |
| | | | | 705/72 |

* cited by examiner

SYSTEM AND METHOD FOR PIN ENTRY ON MOBILE DEVICES

CROSS REFERENCE TO RELATED CO-PENDING APPLICATIONS

This application claims the benefit of U.S. provisional application Ser. No. 61/736,116 filed on Dec. 12, 2012 and entitled SYSTEM AND METHOD FOR PIN ENTRY ON MOBILE DEVICES, which is commonly assigned, and the contents of which are expressly incorporated herein by reference.

FIELD OF THE INVENTION

The present invention relates to a system and a method for PIN entry on mobile computing devices.

BACKGROUND OF THE INVENTION

Portable personal computing devices such as smart phones, Personal Digital Assistant, portable computers, tablet computers and audio devices such as digital music players have become ubiquitous in recent years. This opens up the possibility of many different mobile applications such as mobile banking, mobile payment, mobile commerce, and person-to-person money transfer, among others.

One of most important aspects of these applications is the authentication of the user and verification of the identity. In many systems, the authentication is done by using a 4 to 12 digits number called a Personal Identification Number (PIN). The PIN is a number known only to that person and not to anyone else. In multiple factor authentication systems, a combination of "something you know", "something you have" and "something you are" is used. "Something you have" can be a digital token, a card. "Something you are" is some biometrics like facial characteristics, fingerprints, voice, iris or retina scan or even DNA. PIN, password and personal information such as date of birth fall into the category of "something you know".

For payment cards, PIN is the most sensitive piece on information used for authentication. There are Payment Card Industry (PCI) regulations or other industrial standards that govern how the PIN should be handled by a terminal that accepts a PIN. In the past, PINs are entered by specially designed PIN-entry devices (PEDs). These PIN entry devices are tamper-resistant, and because of the stringent security requirements, are usually very expensive.

Accepting PIN entry by using software running on mobile devices and by using the keys or touch screens on the mobile devices are inherently insecure because of malwares, Trojan horses or hacked operating systems. It is possible that keyloggers and screen capturers can capture the user input and then send it to hackers. One of the challenges in the design of a mobile terminal is how to allow a mobile phone to accept a PIN securely. Therefore, there is a need for a system and a method for secure and yet convenient PIN entry.

SUMMARY OF THE INVENTION

The invention provides a secure and convenient way for PIN entry on a mobile computing device with the use of a peripheral device.

In general, in one aspect, the invention features a system for entering a secure Personal Identification Number (PIN) into a mobile computing device. The system includes a mobile computing device and a peripheral device. The mobile computing device includes a mobile application and a display and the mobile application is configured to run on the mobile computing device and to display a grid on the mobile computing device display. The peripheral device includes a display and an encryption engine, and the peripheral device display is configured to display a grid corresponding to the grid displayed on the mobile computing device display. The peripheral device is connected to the mobile computing device via a data communication link. Positional inputs on the mobile computing device grid are configured to be sent to the peripheral device and the peripheral device is configured to decode the positional inputs into PIN digits and to generate an encrypted PIN and then to send the encrypted PIN back to the mobile computing device.

Implementations of this aspect of the invention may include one or more of the following features. The mobile application is configured to display the grid on the mobile computing device without showing any digits. The grid displayed on the peripheral device includes a randomized grid of digits. The grid displayed on the peripheral device is configured to randomize the position of each digit on the grid after each positional input. The encryption engine in the peripheral device is configured to store one or more cryptographic keys and the one or more cryptographic keys are used for encrypting PIN and/or data. The encryption engine in the peripheral device is configured to perform cryptographic operations comprising encryption, decryption, digital signature, hashing, and random number generation. The data communication link comprises a wired data communication link and the wired data communication link comprises one of USB, Firewire, RS232 or audio jack interface. The data communication link comprises a wireless data communication link and the wireless data communication link comprises one of WiFi, Bluetooth, Infrared, or NFC interface. The peripheral device comprises one of magnetic card reader, EMV card reader, NFC reader, keypad, or biometrics readers. The mobile computing device comprises one of mobile phones, personal digital assistants (PDAs), netbooks, tablet computers, notebook computers, electronic readers, digital music players, digital video players, or game consoles. Positional inputs on the mobile computing device are provided via one of touch screens, mouse clicks, track ball, or eyeball movement tracking devices.

In general, in one aspect, the invention features a method for entering a secure Personal Identification Number (PIN) into a mobile computing device including the following. Providing a mobile computing device comprising a mobile application and a display. The mobile application is configured to run on the mobile computing device and to display a grid on the mobile computing device display. Next, providing a peripheral device comprising a display and an encryption engine. The peripheral device display is configured to display a grid corresponding to the grid displayed on the mobile computing device display. The peripheral device is connected to the mobile computing device via a data communication link. Next, providing positional inputs on the mobile computing device and wherein the positional inputs are configured to be sent to the peripheral device and the peripheral device is configured to decode the positional inputs into PIN digits and to generate an encrypted PIN and then to send the encrypted PIN back to the mobile computing device.

The details of one or more embodiments of the invention are set forth in the accompanying drawings and description bellow. Other features, objects and advantages of the invention will be apparent from the following description of the preferred embodiments, the drawings and from the claims.

DETAILED DESCRIPTION OF THE INVENTION

The present invention describes a system and the method for entering a PIN on mobile computing devices in a secure and convenient manner. A representation of a digits grid is shown on a peripheral device and the actual input captures are done on a separate mobile computing device. Positional information captured on the mobile computing device is mapped back into its PIN representation on the peripheral device. This separation adds another layer of security to the PIN input process that can help reduce the complexity of the design of both the mobile phone application and the peripheral device.

Figure 1:
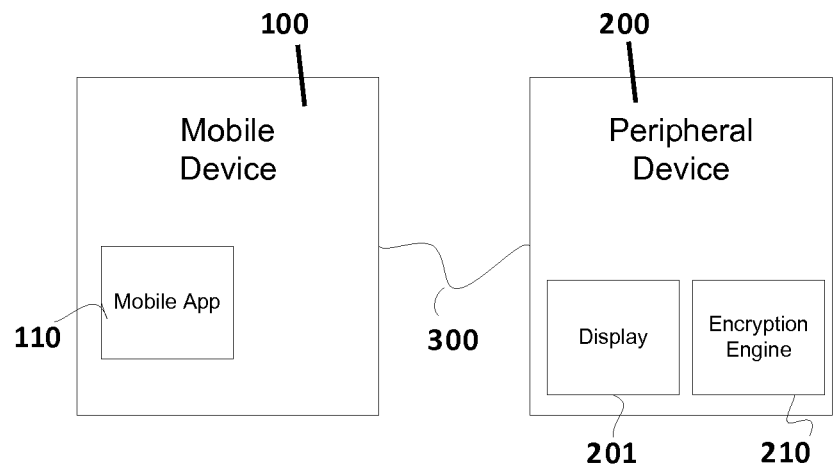
FIG. 1 shows a mobile computing device 100 and a peripheral device 200 connected together via the wired or wireless data communication link 300.

Referring to FIG. 1, a peripheral device 200 and a mobile computing device 110 are connected together through a data communication link 300. The data communication link 300 may be a wired connection or a wireless connection. The wired connection may be implemented via one of USB, Firewire, RS232 or audio jack interface. The wireless connection may be implemented via one of WiFi, Bluetooth, Infrared, NFC or other forms of data coupling.

Figure 2:
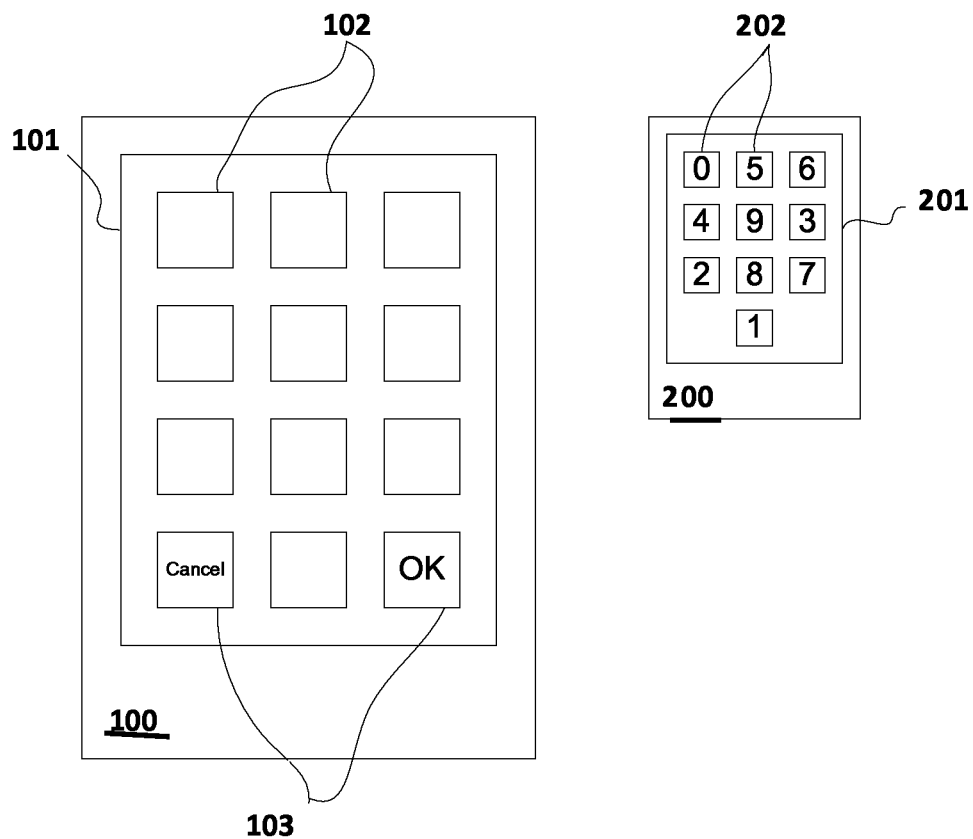
FIG. 2 shows a randomized key grid display 201 on the peripheral device 200 and a 101 without the digits shown on the mobile computing device 100.

When PIN entry is required, the peripheral device 200 displays a randomized grid of digits 201 and keys 202, as shown in FIG. 2. A software application 110 on the mobile computing device 100 displays a corresponding grid 101 of the same arrangement without the digits shown on the key positions 102. The PIN is entered in the mobile computing device 100 by pressing the corresponding key positions 102 on the grid 101 shown on the mobile computing device 100 relative to the key positions 202 on the grid 201 shown on the peripheral device 200. After each key press on the mobile computing device grid 101, the position is sent to the peripheral device 200 and from the relative position of the key press, the PIN digits intended to be entered are computed by the peripheral device 200, processed and sent back to the mobile computing device 100 in an encrypted or otherwise cryptographically secure format. In one example, the format is an Encrypted PIN Block (EPB) format. The EPB can be further transmitted to other parties such as a payment processor gateway for further processing.

The peripheral device 200 is used to generate and display a randomized grid of digits on its display 201. The display 201 may be one of LCD displays, LED displays, plasma or seven segment displays. In the peripheral device 200, there is an encryption engine 210 capable of decoding the inputs from the mobile application 110 and encode the PIN into a secure format such as an Encrypted PIN Block (EPB).

Mobile application 110 runs on the mobile computing device 100 and communicates with the peripheral device 200 through the data communication link 300. When PIN entry is required, the mobile application 110 tells the peripheral device 200 to generate and display the randomized number grid 201, as shown in FIG. 2. The mobile phone 100 displays a corresponding grid 101 without the numbers. Function keys 103, such as "Cancel", "Back", "OK" and "Enter" are also shown on the mobile phone 100.

When a user wants to enter a number, the corresponding position on grid 101 displayed by the mobile phone application 110 is pressed, touched or otherwise indicated by a position pointing device or methods. This position pointing device or method may be one of touch screens, mouse click, track ball, or eyeball movement tracking devices. In one example, pressing the top-right square on the grid 101 on the mobile phone 100 means the user intends to enter the digit "6", as shown in FIG. 2.

There are no numbers shown on the mobile phone grid display 101 and the mobile phone application 110 has no way of knowing what positions correspond to which numbers. In this way, even if the mobile phone 100 is infected with malware such as keyloggers and screen capturers, it will be impossible for the malware to recover the PIN entered.

Figure 3:
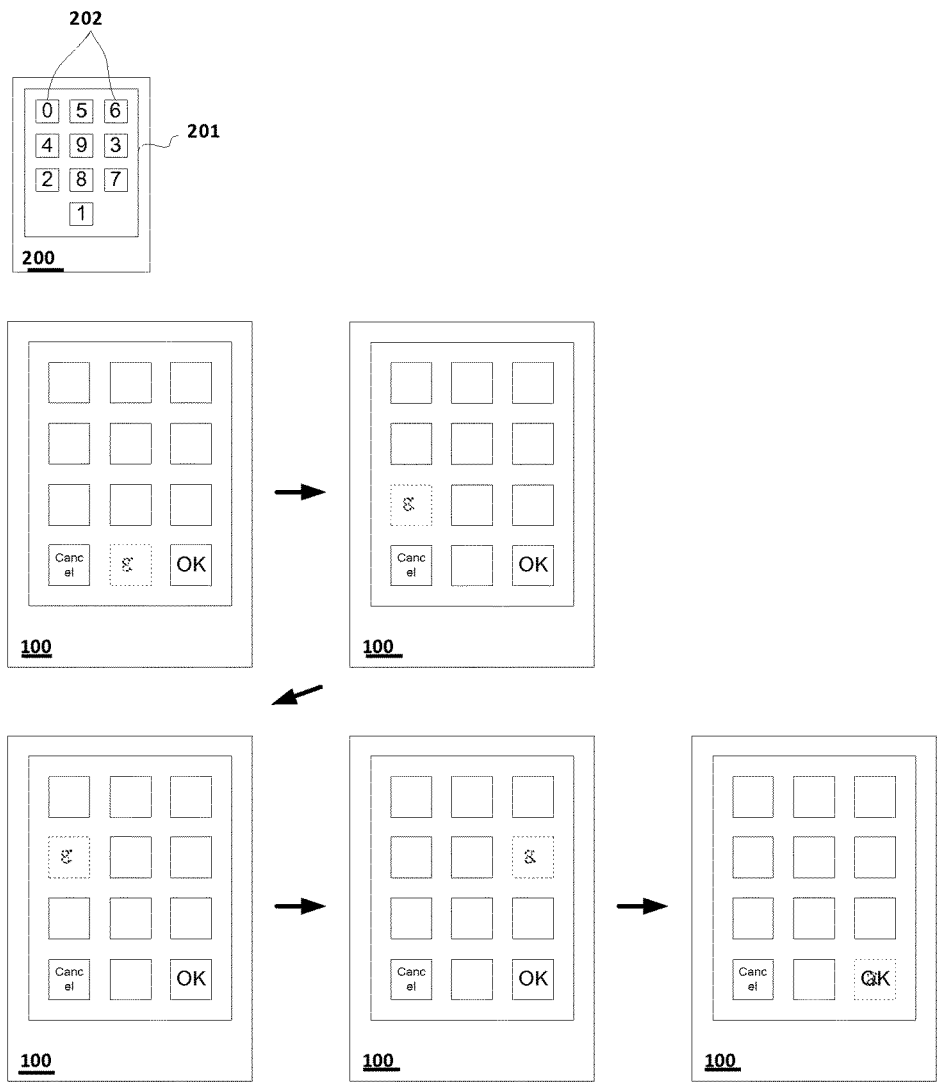
FIG. 3 illustrates the sequence of positions pressed on the mobile communication device grid 101 to enter the PIN sequence "1243" using the randomized grid pattern in the peripheral device grid 201.

FIG. 3 illustrates the user actions to enter the PIN sequence "1243". The four positions corresponding to the "1", "2", "4" and "3" shown on the peripheral device 200 are pressed sequentially. After each key press, the mobile application 110 sends the position data to the peripheral device 200 and the peripheral device 200 uses the positional information to decode which digit is inputted. After the four PIN digits are entered, the "OK" key is pressed and the mobile application 110 tells the peripheral device 200 that all digits have been entered. The peripheral device 200 then processes and encrypts the input positions and sends back an encrypted output of the PIN.

In this example, the randomized grid 201 does not shuffle after each key press. However, in other examples grid 201 randomizes the position of the displayed digits after every key press.

It is understood that the invention applies to all mobile computing devices including, but not limited to, mobile phones, personal digital assistants (PDAs), netbooks, tablet computers, notebook computers, electronic readers, digital music players, digital video players, game consoles, among others.

Several embodiments of the present invention have been described. Nevertheless, it will be understood that various modifications may be made without departing from the spirit and scope of the invention. Accordingly, other embodiments are within the scope of the following claims.

What is claimed is:

1. A system for entering a secure Personal Identification Number (PIN) into a mobile computing device comprising:
   a mobile computing device comprising a mobile application and a display, wherein the mobile application runs on the mobile computing device and displays a mobile computing device grid on the mobile computing device display, the mobile computing device grid comprising a first plurality of input keys;
   a peripheral device comprising a display and an encryption engine, wherein in response to a request transmitted to the peripheral device from the mobile computing device,
      the peripheral device generates a peripheral device grid corresponding to the mobile computing device grid displayed on the mobile computing device display, the peripheral device grid comprising a second plurality of input keys, and the peripheral device display displays the peripheral device grid, and positional information in association with the peripheral device grid not displayed on the mobile computing device grid;

wherein the peripheral device is a physically separate device from the mobile computing device and is coupled to the mobile computing device via a data communication link;

wherein positional inputs are entered on the mobile computing device grid based on the positional information associated with the peripheral device grid displayed on the peripheral device display, said entered positional inputs being sent to the peripheral device from the mobile computing device;

the peripheral device decodes the received positional inputs into PIN digits, generates an encrypted PIN, and sends the encrypted PIN back to the mobile computing device, wherein the mobile computing device does not store the unencrypted PIN digits, wherein the displayed peripheral device grid and the positional information associated therewith comprises a randomized grid of digits; and wherein the displayed peripheral device grid randomizes the position of each digit on the peripheral device grid after each positional input on the mobile computing device.

2. The system of claim 1, wherein the mobile application displays the grid on the mobile computing device without showing any digits.

3. The system in claim 1, wherein the peripheral device comprises one of a magnetic card reader, EMV card reader, NFC reader, keypad, or biometrics readers.

4. The system of claim 1, wherein the mobile computing device comprises one of mobile phones, personal digital assistants (PDAs), netbooks, tablet computers, notebook computers, electronic readers, digital music players, digital video players, or game consoles.

5. The system of claim 1, wherein the positional inputs on the mobile computing device are provided via one of touch screens, mouse clicks, track ball, or eyeball movement tracking devices.

6. The system of claim 1, wherein the peripheral device is directly connected to the mobile computing device via the data communication link, and the request is transmitted to the peripheral device from the mobile computing device using the data communication link.

7. The system of claim 6, wherein
the data communication link comprises either a wired data communication link or a wireless data communication link, wherein
the wired data communication link comprises one of USB, Firewire, RS232 or audio jack interface, and
the wireless data communication link comprises one of WiFi, Bluetooth, Infrared or NFC interface.

8. The system of claim 1, wherein each positional input comprises pressing one of said first plurality of input keys.

9. The system of claim 1, wherein the generation of the encrypted PIN is performed by the peripheral device encryption engine.

10. A method for entering a secure Personal Identification Number (PIN) into a mobile computing device comprising:
providing a mobile computing device comprising a mobile application and a display wherein the mobile application runs on the mobile computing device, the mobile application displaying a mobile computing device grid comprising a first plurality of input keys;
providing a peripheral device comprising a display and an encryption engine;
wherein the peripheral device is a physically separate device from the mobile computing device and is coupled to the mobile computing device via a data communication link; said method further comprising
requesting by the mobile application to the peripheral device, the generation of a peripheral device grid,
displaying, in response to said requesting, on the peripheral device display, the peripheral device grid, wherein the peripheral device grid displays positional information not displayed on the mobile computing device grid;
accepting, by the mobile computing device, positional inputs entered based on the positional information associated with the peripheral device grid displayed on the peripheral device display;
sending, by the mobile computing device, the positional inputs to the peripheral device;
converting, by the peripheral device, the received positional inputs into PIN digits;
encrypting, by the peripheral device, the PIN digits into an encrypted PIN; and
transmitting the encrypted PIN to the mobile computing device, wherein the mobile computing device does not store the unencrypted PIN digits,
wherein the displayed peripheral device grid and the positional information associated therewith comprises a randomized grid of digits, and
wherein the displayed peripheral device grid randomizes the position of each digit on the peripheral device grid after each positional input on the mobile computing device.

11. The method of claim 10, wherein the mobile application displays the grid on the mobile computing device without showing any digits.

12. The method in claim 10, wherein the peripheral device comprises one of a magnetic card reader, EMV card reader, NFC reader, keypad, or biometrics readers.

13. The method of claim 10, wherein the mobile computing device comprises one of mobile phones, personal digital assistants (PDAs), netbooks, tablet computers, notebook computers, electronic readers, digital music players, digital video players, or game consoles.

14. The method of claim 10, wherein the positional inputs on the mobile computing device are provided via one of touch screens, mouse clicks, track ball, or eyeball movement tracking devices.

15. The method of claim 10, wherein the peripheral device is directly connected to the mobile computing device via the data communication link, and the requesting is performed using the data communication link.

16. The method of claim 15, wherein
the data communication link comprises either a wired data communication link or a wireless data communication link, wherein
the wired data communication link comprises one of USB, Firewire, RS232 or audio jack interface, and
the wireless data communication link comprises one of WiFi, Bluetooth, Infrared or NFC interface.

17. The method of claim 10, wherein each positional input comprises pressing one of said first plurality of input keys.

18. The method of claim 10, wherein the encrypting of the PIN digits into the encrypted PIN is performed by the peripheral device encryption engine.

* * * * *